(12) United States Patent
Liang et al.

(10) Patent No.: US 10,437,908 B2
(45) Date of Patent: Oct. 8, 2019

(54) CONTENT DELIVERY NETWORK (CDN)-BASED WEBSITE ACCELERATION METHOD AND SYSTEM

(71) Applicant: WANGSU SCIENCE & TECHNOLOGY CO., LTD., Shanghai (CN)

(72) Inventors: Longhu Liang, Shanghai (CN); Wenqiang Guo, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 235 days.

(21) Appl. No.: 15/531,395

(22) PCT Filed: Dec. 31, 2014

(86) PCT No.: PCT/CN2014/095903
§ 371 (c)(1),
(2) Date: May 26, 2017

(87) PCT Pub. No.: WO2016/082289
PCT Pub. Date: Jun. 2, 2016

(65) Prior Publication Data
US 2017/0344657 A1 Nov. 30, 2017

(30) Foreign Application Priority Data
Nov. 27, 2014 (CN) .......................... 2014 1 0705603

(51) Int. Cl.
*G06F 16/957* (2019.01)
*H04L 29/08* (2006.01)
(Continued)

(52) U.S. Cl.
CPC .......... *G06F 16/9574* (2019.01); *H04L 29/08* (2013.01); *H04L 43/00* (2013.01);
(Continued)

(58) Field of Classification Search
None
See application file for complete search history.

(56) References Cited

U.S. PATENT DOCUMENTS

| | | | |
|---|---|---|---|
| 2009/0100128 A1 | 4/2009 | Czechowski, III et al. | |
| 2014/0149578 A1* | 5/2014 | Goldman | H04L 45/02 709/224 |
| 2014/0207818 A1* | 7/2014 | Jellick | H04L 41/082 707/771 |

FOREIGN PATENT DOCUMENTS

| CN | 101764747 A | 6/2010 |
|---|---|---|
| CN | 101989951 A | 3/2011 |
| CN | 102769819 A | 11/2012 |

OTHER PUBLICATIONS

Sep. 11, 2015 International Search Report issued in International Patent Application No. PCT/CN2014/095903.
(Continued)

*Primary Examiner* — Richard L Bowen
(74) *Attorney, Agent, or Firm* — Oliff PLC

(57) ABSTRACT

A website acceleration method and system based on a content delivery network. The method includes: detecting a resource structure of a website and acquiring a domain name and resource of the website; monitoring operation data of the website, acquiring a user individual IP distribution of an accessed website, analyzing and acquiring a region to which the user individual IP belongs, a network operator type and resource accessed by the user individual IP; connecting an accelerated domain name provided by each CDN acceleration service provider, and establishing a comparison task of comparing each CDN acceleration service provider to the acceleration effect of the website according to the operation data of the website; acquiring the optimal accelerated domain name of the website in each region, each network operator and different types of resource according to test
(Continued)

result of the comparison task of the acceleration effect; and selecting the optimal CDN acceleration service provider corresponding to each resource according to the optimal accelerated domain name. The present invention enables a website to select a CDN acceleration service according to the website's own practical situation, achieving an optimal acceleration effect in each national region, and reasonably controlling usage costs.

10 Claims, 3 Drawing Sheets

(51) Int. Cl.
*H04L 12/26* (2006.01)
*G06F 16/172* (2019.01)

(52) U.S. Cl.
CPC ........ *H04L 67/2852* (2013.01); *G06F 16/172* (2019.01); *H04L 67/02* (2013.01)

(56) References Cited

OTHER PUBLICATIONS

May 30, 2017 International Preliminary Report on Patentability issued in International Patent Application No. PCT/CN2014/095903.

\* cited by examiner

CONTENT DELIVERY NETWORK (CDN)-BASED WEBSITE ACCELERATION METHOD AND SYSTEM

BACKGROUND OF THE PRESENT INVENTION

Field of Invention

The present invention belongs to the technical field of network communication and relates to the website acceleration method and system based on a content delivery network.

Description of Related Arts

CDN (Content Delivery Network) is a new manner of network construction and is the network covering layer specially optimized for delivering wideband rich media in a traditional IP network. In broad themes, CDN represents a network service mode based on quality and order. Simply, CDN is a strategically deployed integral system and comprises four elements, i.e., distributed storage, load balancing, network request redirection and content management, wherein content management and global network traffic management are cores of CDN. Through judgment of user proximity and server load, CDN guarantees contents to provide services for requests of users in an extremely high efficiency manner. In general, content services are implemented based on cache servers, which are also called as surrogates. Surrogates are located on edges of networks and are only a single hop distant from users. Simultaneously, surrogate is a transparent mirror image of a source server of a content provider (usually located in a data center of a CDN service provider). Such architecture enables CDN service providers to provide the best possible experience to final users on behalf of their customers, i.e., content providers, while these users cannot tolerate any delay in request response time.

A basic concept of CDN is to avoid bottlenecks and links, which may influence data transmission speed and stability of the Internet as far as possible, so as to enable content transmission to be faster and more stable. Through a layer of intelligent virtual network constructed based on the existing Internet by placing node servers at all positions of a network, a CDN system can redirect requests of users to service nodes closest to the users in real time according to comprehensive information such as network traffic, connections between each node, load situation of each node, distance to users and response time, etc. The purposes are to enable the users to obtain the desired contents nearby, to solve the condition of Internet network congestion and to improve response speed when users access to networks.

With the popularization of CDN, more and more websites select to adopt CDN to accelerate access speed of websites. Hence, more and more professional CDN acceleration service providers emerge. Each CDN manufacturer has a respective acceleration technology, hardware equipment and acceleration effects, the options of CDN manufacturers for websites are more and more and it is increasingly difficult to make a choice.

Under normal circumstances, a CDN acceleration solution adopted by a website comprises the following steps:

1. An enterprise self-selects a CDN manufacturer having a good reputation in the market to carry out an accelerate test service.

2. The selected CDN manufacturer provides a domain alias and does the domain alias on a DNS server to which the website belongs.

3. The selected CDN manufacturer provides a CDN acceleration service for the website and provides comparison data of effects achieved before and after acceleration in all regions of the whole country.

The existing website CDN acceleration solution has the following defects:

1. CDN acceleration is done in each national region, users in individual regions are relatively few, temporarily the service is not needed and consequently expenditure waste is caused.

2. For resources under different domain names of a same website, one or more CDN manufacturers serve a same region and cannot certainly provide optimal acceleration effects for each region.

3. For different resources under a same domain name of a same web site, one or more CDN manufacturers cannot certainly provide optimal acceleration effects for each region.

4. For a same resource under a same domain name of a same web site, one CDN manufacturer cannot certainly provide optimal acceleration effects for each region.

SUMMARY OF THE PRESENT INVENTION

In view of the disadvantages of the prior art, the purpose of the present invention is to provide a website acceleration method and system based on a content delivery network, which are used for solving the problems that the basis for the existing website to select a CDN acceleration solution is limited, optimal acceleration effects cannot be realized in all regions and resource waste is caused.

In order to realize the above-mentioned purpose and other related purposes, the present invention provides a website acceleration method based on a content delivery network. The website acceleration method based on the content delivery network comprises: detecting a resource structure of a website and acquiring a domain name and resource of the website; monitoring operation data of the website, acquiring a user individual IP distribution of an accessed website, analyzing and acquiring a region to which the user individual IP belongs, a network operator type and resource accessed by the user individual IP; connecting an accelerated domain name provided by each CDN acceleration service provider, and establishing a comparison task of comparing each CDN acceleration service provider to the acceleration effect of the website according to the operation data of the website; acquiring an optimal accelerated domain name of the website in each region, each network operator and different types of resource according to a test result of the comparison task of the acceleration effects; and selecting an optimal CDN acceleration service provider corresponding to each resource according to the optimal accelerated domain name.

Optionally, the comparison task of the acceleration effects comprises performing comparison of the acceleration effects of different types of resource, specifically includes: comparison of acceleration effects of accessing resources under different domain names of the website; comparison of speed of accessing different resources under a same domain name of the website; and/or comparison of speed of accessing a same resource under a same domain name of the website.

Optionally, the comparison task of the acceleration effects further comprises performing comparison of acceleration effects of accessing different types of resource by different user individual IP, specifically includes: comparison of tested speed of accessing website resources by user individual IP different network operator types in a same region under an acceleration service provided by each CDN acceleration service provider; comparison of tested speed of accessing website resources in different regions by user individual IP of a same network operator type in a same region under an acceleration service provided by each CDN acceleration service provider; and/or comparison of tested speed of accessing website resources in different regions by user individual IP of a same network operator type in different regions under an acceleration service provided by each CDN acceleration service provider.

Optionally, the website acceleration method based on the content delivery network further comprises: establishing a comparison task of comparing each CDN acceleration service provider to the website acceleration effect and website non-acceleration effect according to conditions of different types of resource, different access conditions and different CDN acceleration service providers; and automatically analyzing according to the test result of the comparison task of the acceleration effects to confirm which CDN acceleration service provider achieves the optimal effect when being used in each region and by different network operators, and acquire an analysis report of joint acceleration performed by the CDN acceleration service providers nationwide.

Optionally, an implementation process of detecting the resource structure of the web site and acquiring the resources under all domain names of the web site comprises: detecting and extracting all uniform resource locators under the website; and analyzing the all uniform resource locators to obtain all resources of the website and domain names of the website to which each resource belongs.

Optionally, the CDN acceleration service providers comprise professional CDN acceleration service providers and website self-established CDN service modes.

The present invention further provides a website acceleration system based on a content delivery network. The website acceleration system based on the content delivery network comprises: a resource detection module configured to detect a resource structure of a web site and acquire a domain name and resource of the website; an operation monitoring module connected with the resource detection module and configured to monitor operation data of the website, acquire a user individual IP distribution of an accessed website, analyze and acquire a region to which the user individual IP belongs, a network operator type and resource accessed by the user individual IP; an acceleration comparison module connected with the operation monitoring module and configured to connect an accelerated domain name provided by each CDN acceleration service providers, and establish a comparison task of comparing each CDN acceleration service provider to the acceleration effect of the website according to the operation data of the website; an acceleration selection module connected with the acceleration comparison module and configured to acquire an optimal accelerated domain names of the website in each region, each network operator and different types of resource according to a test result of the comparison task of the acceleration effects; and an acceleration execution module connected with the acceleration selection module and configured to select an optimal CDN acceleration service provider corresponding to each resource according to the optimal accelerated domain names.

Optionally, the acceleration comparison module comprises: a resource acceleration comparison unit configured to perform comparison of the acceleration effect of different types of resource, including comparison of acceleration effect of accessing resources under different domain names of the website, comparison of speed of accessing different resources under a same domain name of the website, and/or comparison of speed of accessing a same resource under a same domain name of the website; and an IP acceleration comparison unit configured to perform comparison of acceleration effects of accessing different types of resource by different user individual IP, including comparison of tested speed of accessing website resources user individual IP of different network operator types in a same region, comparison of tested speed of accessing website resources in different regions user individual IP of a same network operator type in a same region, and/or comparison of tested speed of accessing website resources in different regions user individual IP of a same network operator type in different regions under an acceleration service provided by each CDN acceleration service provider.

Optionally, the website acceleration system based on the content delivery network further comprises: an acceleration and non-acceleration comparison module connected with the operation monitoring module and configured to establish a comparison task of comparing each CDN acceleration service provider to the website acceleration effect and website non-acceleration effect according to conditions of different types of resources, different access conditions and different CDN acceleration service providers; and an acceleration result acquisition module connected with the acceleration selection module and configured to automatically analyze according to the test result of the comparison task of the acceleration effects to confirm which CDN acceleration service provider achieves the optimal effect when being used in each region and by different network operators, and acquire an analysis report of joint acceleration performed by the CDN acceleration service providers nationwide.

Optionally, the resource detection module comprises: a resource information detection unit configured to detect and extract all uniform resource locators under the website; and a resource information acquisition unit connected with the resource information detection unit and configured to analyze the all uniform resource locators to obtain all resources of the website and domain names of the website to which each resource belongs.

As described above, the website acceleration method and system based on the content delivery network provided by the present invention have the following beneficial effects:

The present invention realizes the effect that the website can pertinently and automatically selects to use or not use the CDN acceleration service and use which kind of CDN acceleration service according to the practical situation of the website, the acceleration effect in each national region is optimal and the usage costs are reasonably controlled.

DESCRIPTION OF COMPONENT MARK NUMBERS

| | |
|---|---|
| 400 | Website acceleration system |
| 410 | Resource detection module |
| 411 | Resource information detection unit |
| 412 | Resource information acquisition unit |
| 420 | Operation monitoring module |
| 430 | Acceleration comparison module |
| 431 | Resource acceleration comparison unit |
| 432 | IP acceleration comparison unit |
| 440 | Acceleration and non-acceleration comparison module |
| 450 | Acceleration selection module |
| 460 | Acceleration execution module |
| 470 | Acceleration result acquisition module |
| S101~S107 | Steps |
| S201~S202 | Steps |
| S301~S302 | Steps |

DETAILED DESCRIPTION OF THE PREFERRED EMBODIMENTS

The implementation mode of the present invention will be described below through specific embodiments. One skilled in the art may easily understand other advantages and effects of the present invention according to contents disclosed by the description. The present invention may also be implemented or applied through other different specific implementation modes. Various modifications or changes may also be made to all details in the description based on different points of view and applications without departing from the spirit of the present invention.

Please refer to the drawings. It needs to be stated that the drawings provided in the following embodiments are just used for schematically describing the basic concept of the present invention, thus only illustrate components only related to the present invention and are not drawn according to the numbers, shapes and sizes of components during actual implementation, the configuration, number and scale of each component during actual implementation thereof may be freely changed, and the component layout configuration thereof may be more complex.

The present invention will be described below in detail in combination with the embodiments and the drawings.

Embodiment

Figure 1:
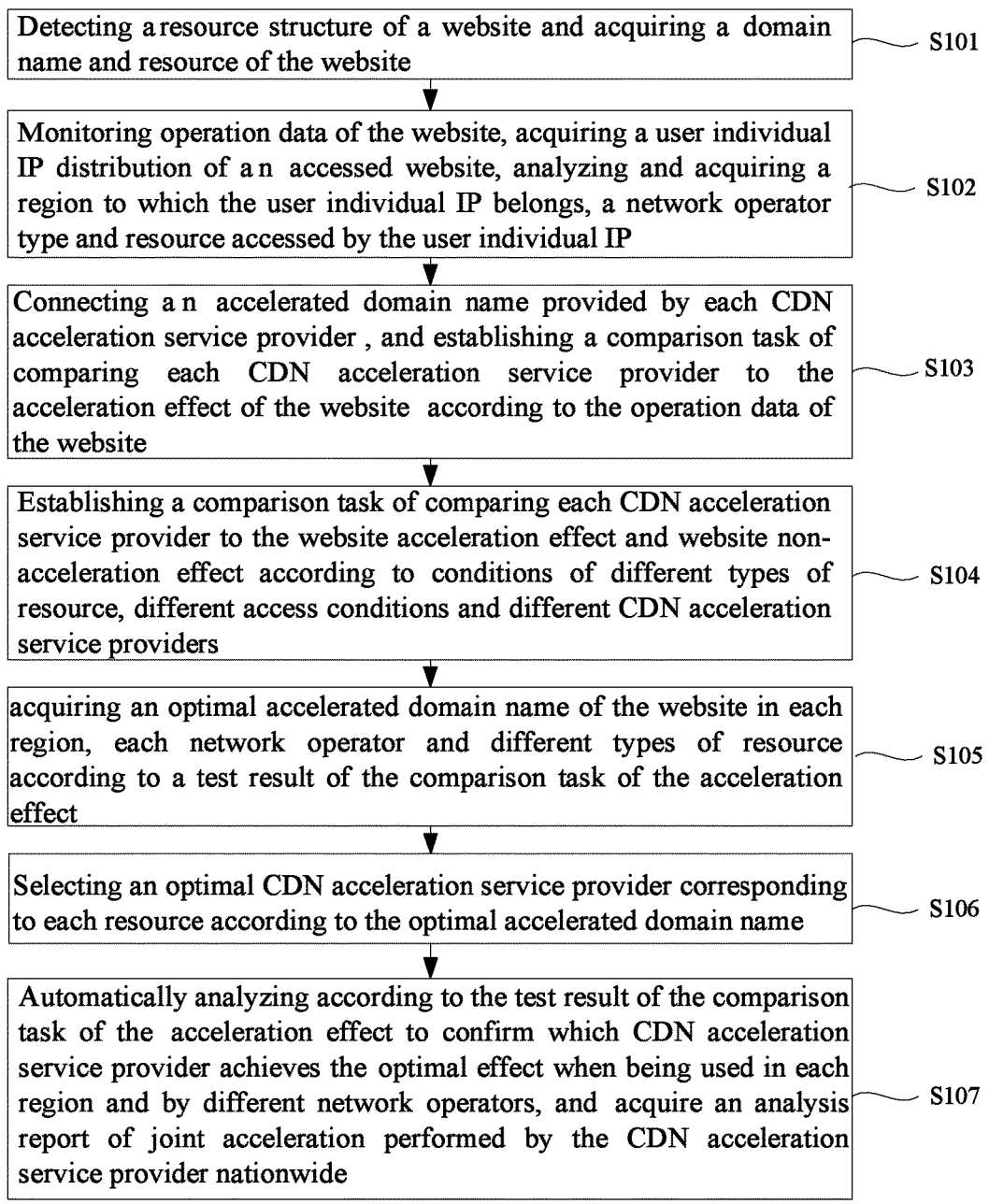
FIG. 1 is an implementation flow diagram schematic of a website acceleration method based on a content delivery network according to an embodiment of the present invention.

This embodiment provides a website acceleration method based on a content delivery network. As illustrated in FIG. 1, the website acceleration method based on the content delivery network comprises:

S101: detecting a resource structure of a website and acquiring a domain name and resource of the website.

Figure 2:
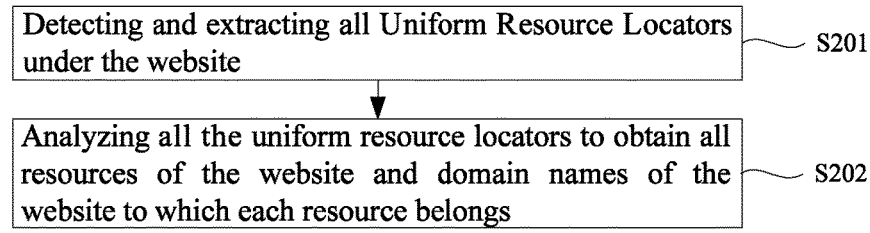
FIG. 2 is a specific implementation flow diagram schematic of step S101 according to an embodiment of the present invention.

Further, as illustrated in FIG. 2, an implementation process of detecting the resource structure of the website and acquiring the resources under each domain name of the website comprises:

S201: detecting and extracting all Uniform Resource Locators (URL) under the website. URL is a simple expression of locations and access methods of resources that maybe obtained from the Internet. In this step, all URLs under the website can be automatically extracted according to an input URL.

S202: analyzing all the uniform resource locators to obtain all resources of the website and domain names of the website to which each resource belongs. All uniform resource locators of the website are automatically analyzed such that a total number of resources of the website and a number of resources under each domain name of the website maybe obtained.

Implementation modes of step S101 may be various and are not limited to an implementation mode which is taken as an example in this embodiment and is illustrated in FIG. 2. Any modes, which are implemented by using the prior art of detecting the resource structure of the website and acquiring the resources under all domain names of the website are included in the protection scope of the present invention.

S102: monitoring operation data of the website, acquiring a user individual IP distribution of an accessed website, analyzing and acquiring a region to which the user individual IP belongs, a network operator type and resource accessed by the user individual IP. In this step, each individual IP through which the website is accessed may be collected, a total number of individual IP may be obtained through analysis according to the collected data, a number of individual IP of the website in each large region may also be obtained through automatic analysis according to a preset IP information library and website access situations, and even a number of individual IP of the website in each province may be obtained through automatic analysis; and in addition, an operator to which each individual IP belongs, i.e., a network operator type such as Telecom, China Mobile, China Unicom or Great Wall may also be automatically analyzed according to a preset operator information library and website access situations.

Implementation modes of step S102 may be various and are not limited to an implementation mode, which is taken as an example in this embodiment, of obtaining needed information according to IPs through which the website is accessed. Any modes, which are implemented by using the prior art, of acquiring various relevant needed information of the website according to the operation data of the website may be used for the present invention.

S103: connecting an accelerated domain names provided by each CDN acceleration service provider (CDN service providers for short), and establishing a comparison task of comparing each CDN acceleration service provider to the acceleration effect of the website according to the operation data of the website. Therein, the CDN acceleration service provider comprises professional CDN acceleration service provider and website self-established CDN service mode, and may also comprises CDN acceleration service provider of other types. The protection scope of the present invention is not limited to the types of the CDN acceleration service providers.

Figure 3:
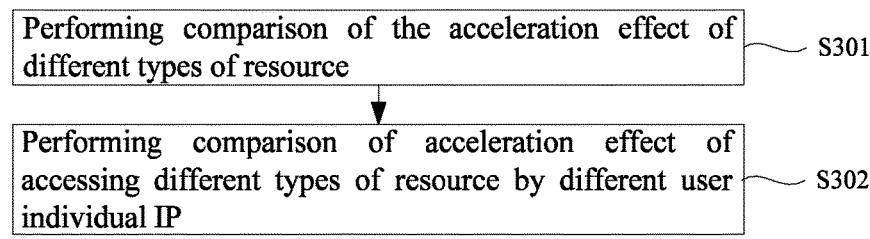
FIG. 3 is a specific comparison content diagram schematic of an effect comparison task according to an embodiment of the present invention.

Further, as illustrated in FIG. 3, the comparison task of the acceleration effects comprises:

S301: performing comparison of the acceleration effect of different types of resource. Specific contents of performing comparison of the acceleration effects of different types of resource comprise: comparison of acceleration effects of accessing resources under different domain names of the website; comparison of speed of accessing different resources under a same domain name of the website; and/or comparison of speed of accessing a same resource under a same domain name of the web site.

S302: performing comparison of acceleration effect of accessing different types of resource by different user individual IP. Specific contents of performing comparison of acceleration effects of accessing different types of resource by different user individual IP comprise: comparison of tested speed of accessing website resources by user individual IP of different network operator types in a same region under an acceleration service provided by each CDN acceleration service provider; comparison of tested speed of accessing website resources in different regions by user individual IP of a same network operator type in a same region under an acceleration service provided by each CDN acceleration service provider; and/or comparison of tested speed of accessing website resources in different regions by user individual IP of a same network operator type in different regions under an acceleration service provided by each CDN acceleration service provider.

The protection scope of the present invention is not limited to the comparison task of the specific effects which is taken as an example in this embodiment, and specific details and types of the comparison task may be flexibly set according to the needs during actual application. In other words, in this embodiment, according to the various types of created effect comparison tasks, comparison of acceleration effects of accessing each resource under different domain names of the website in each province and different operators may be obtained through automatic analysis, comparison of acceleration effects of accessing a same resource under a same domain name of the website in each province and different operators may be obtained through automatic analysis, etc.

S104: establishing a comparison task of comparing each CDN acceleration service provider to the website acceleration effect and website non-acceleration effect according to conditions of different types of resource, different access conditions and different CDN acceleration service providers.

From step S103 to step S104, it can be seen that a comparison task of performance when the website acceleration is performed by different CDN manufacturers, self-established CDN manufacturers, and no CDN manufacturer provides website acceleration is automatically established according to the accelerated domain name provided by each CDN acceleration service provider.

S105: acquiring an optimal accelerated domain name of the website in each region, each network operator and different types of resource according to a test result of the comparison task of the acceleration effect.

In step S105, performance comparison data may be collected according to the test result of the comparison task of the effect, and an optimal CDN acceleration service provider adopted for each resource under different domain names are automatically recommended according to the performance comparison data, or an optimal CDN acceleration service provider adopted for a same resource under a same domain name in different national regions are automatically recommended according to the collected performance comparison data, etc.

S106: selecting an optimal CDN acceleration service provider corresponding to each resource according to the optimal accelerated domain name. For example, a connection between each resource and a corresponding optimal acceleration domain name is kept, and connections between each resource and other accelerated domain names except the corresponding optimal acceleration domain name are disconnected. This step enables the website to realize automatic and objective selection of CDN acceleration service providers.

S107: automatically analyzing according to the test result of the comparison task of the acceleration effect to confirm which CDN acceleration service provider achieves the optimal effect when being used in each region and by different network operators, and acquire an analysis report of joint acceleration performed by the CDN acceleration service provider nationwide. Therein, rules of automatic analysis may be set according to actual application situations.

The protection scope of the present invention is not limited to an execution sequence, which is taken as an example in this embodiment, the steps of the website acceleration method based on the content delivery network. Any variations such as flexible sequence adjustment, step replacement, deletion and addition and the like made according to the actual needs are included in the protection scope of the present invention.

The present invention enables the website to have functions of selecting CDN manufacturers with superior service quality according to automatic assessment results, selecting which CDN manufacturers in which regions to provide acceleration services according to a number of website resources and distribution of users, selecting which regions where CDN acceleration services are not used according to the number of website resources and the distribution of users, selecting which regions where self-established CDN acceleration services are used according to the practical situations of the website, selecting which CDN manufacturers to provide acceleration services for resources under different domain names of the website according to the situations of the website, selecting which CDN manufacturers in which regions to provide acceleration services for different resources under a same domain name of the website according to the situations of the website, etc.

This embodiment further provides a website acceleration system based on a content delivery network. This system can realize the website acceleration method based on the content delivery network according to this embodiment. However, a device for realizing the website acceleration method based on the content delivery network according to this embodiment includes but not limited to a structure, which is taken as an example in this embodiment, of the website acceleration system based on the content delivery network.

Figure 4:
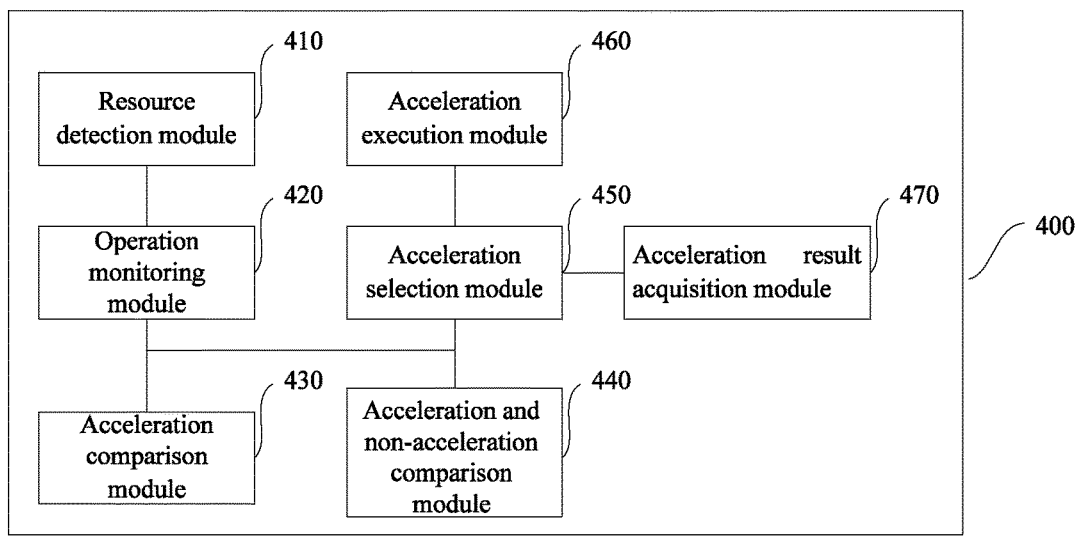
FIG. 4 is an implementation structure diagram schematic of a website acceleration system based on a content delivery network according to an embodiment of the present invention.

As illustrated in FIG. 4, the website acceleration system 400 based on the content delivery network comprises a resource detection module 410, an operation monitoring module 420, an acceleration comparison module 430, an acceleration and non-acceleration comparison module 440, an acceleration selection module 450, an acceleration execution module 460 and an acceleration result acquisition module 470.

The resource detection module 410 is configured to detect a resource structure of a website and acquire domain names and resources of the website.

Figure 5:
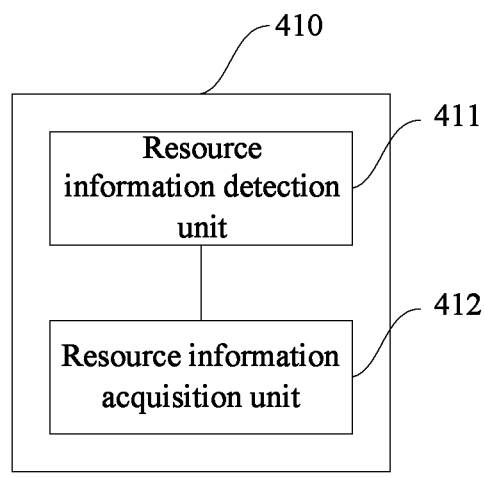
FIG. 5 is a specific implementation structure diagram schematic of a resource detection module according to an embodiment of the present invention.

Further, as illustrated in FIG. 5, the resource detection module 410 comprises a resource information detection unit 411 and a resource information acquisition unit 412. The resource information detection unit 411 is configured to detect and extract all Uniform Resource Locators (URLs) under the website. URL is a simple expression of locations and access methods of resources that can be obtained from the Internet. In this step, all URLs under the website can be automatically extracted according to an input URL. The resource information acquisition unit 412 is connected with the resource information detection unit 411 and is configured to analyze the all uniform resource locators to obtain all resources of the website and domain names of the website to which each resource belongs. By automatically analyzing all uniform resource locators, a total number of resources of the website and a number of resources under each domain name of the website maybe obtained.

Implementation structures of the resource detection module 410 according to this embodiment may be various and are not limited to an implementation structure which is taken as an example and is illustrated in FIG. 5. Any structures, which are implemented by using the prior art, of detecting the resource structure of the website and acquiring the resources under all domain names are included in the protection scope of the resource detection module 410.

The operation monitoring module 420 is connected with the resource detection module 410 and is configured to monitor operation data of the website, acquiring a user individual IP distribution of an accessed website, and perform analysis to obtain a region to which the user individual IP belongs, a network operator type and resource accessed by the user individual IP. The operation monitoring module 420 may collect each individual IP through which the website is accessed, may obtain a total number of individual IP through analysis according to the collected data, may also obtain a number of individual IP of the website in each large region through automatic analysis according to a preset IP information library and website access situations, and even may obtain a number of individual IP of the website in each province through automatic analysis; and in addition, an operator to which each individual IP belongs may also be automatically analyzed according to a preset operator information library and website access situations. Implementation modes of the operation monitoring module 420 may be various and are not limited to an implementation mode, which is taken as an example in this embodiment, of obtaining needed information according to IPs through which the website is accessed. Any modes, which are implemented by using the prior art, of acquiring various relevant needed information of the website according to the operation data of the website may be used for replacing the operation monitoring module 420.

The acceleration comparison module 430 is connected with the operation monitoring module 420 and is configured to connect the accelerated domain name provided by each CDN acceleration service provider, and establish a comparison task of comparing each CDN acceleration service provider to the website acceleration effects according to the operation data of the website. Therein, the CDN acceleration service provider comprises professional CDN acceleration service provider and website self-established CDN service modes, and may also comprise other types of CDN acceleration service providers. The protection scope of the present invention is not limited to the types of the CDN acceleration service providers.

Figure 6:
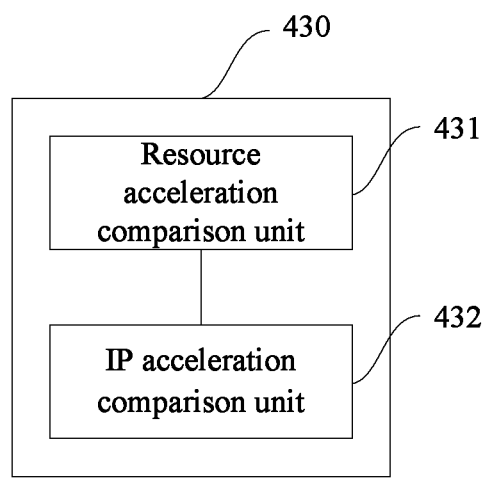
FIG. 6 is a specific implementation structure diagram schematic of an acceleration comparison module according to an embodiment of the present invention.

Further, as illustrated in FIG. 6, the acceleration comparison module 430 may comprise a resource acceleration comparison unit 431 and an IP acceleration comparison unit 432. The resource acceleration comparison unit 431 is configured to perform comparison of the acceleration effects of different types of resource, including comparison of acceleration effects of accessing resources under different domain names of the website, comparison of speed of accessing different resources under a same domain name of the website, and/or comparison of speed of accessing a same resource under a same domain name of the website. The IP acceleration comparison unit 432 is configured to perform comparison of acceleration effects of accessing different types of resource through different user individual IP, including comparison of tested speed of accessing website resources through user individual IP of different network operator types in a same region, comparison of tested speed of accessing website resources in different regions through user individual IP of a same network operator type in a same region, and/or comparison of tested speed of accessing website resources in different regions through user individual IP of a same network operator type in different regions under an acceleration service provided by each CDN acceleration service provider. In this embodiment, according to the various types of created comparison units, comparison of acceleration effects of accessing each resource under different domain names of the website in each province and different operators may be obtained through automatic analysis, comparison of acceleration effects of accessing a same resource under a same domain name of the website in each province and different operators may be obtained through automatic analysis, etc.

The acceleration and non-acceleration comparison module 440 is connected with the operation monitoring module 420 and is configured to establish a comparison task of comparing each CDN acceleration service provider to the website acceleration effect and website non-acceleration effect according to conditions of different types of resource, different access conditions and different CDN acceleration service providers. In this embodiment, a comparison module of performance achieved when website acceleration is performed by different CDN manufacturers, self-established CDN manufacturers and no CDN manufacturer provides website acceleration may be automatically established according to an accelerated domain name provided by each CDN acceleration service provider.

The acceleration selection module 450 is connected with the acceleration comparison module 430 and/or the acceleration and non-acceleration comparison module 440 and is configured to obtain an optimal accelerated domain name of the website in each region, each network operator and different types of resource according to the test result of the comparison task of the acceleration effects. The acceleration selection module 450 may collect performance comparison data according to the test result of the comparison task of the effects, and automatically recommend an optimal CDN acceleration service provider adopted for each resource under different domain names according to the performance comparison data, or automatically recommend an optimal CDN acceleration service provider adopted for a same resource under a same domain name in different national regions according to the collected performance comparison data, etc.

The acceleration execution module 460 is connected with the acceleration selection module 450 and is configured to select an optimal CDN acceleration service provider corresponding to each resource according to the optimal accelerated domain names. For example, a connection between each resource and a corresponding optimal acceleration domain name is kept, and connections between each resource and other accelerated domain names except the corresponding optimal acceleration domain name are disconnected. The acceleration execution module 460 enables the website to realize automatic and objective selection of CDN acceleration service providers.

The acceleration result acquisition module 470 is connected with the acceleration selection module 450 and is configured to automatically perform analysis according to the test result of the comparison task of the acceleration effect to analyze which CDN acceleration service provider adopted in each region and by different network operators may achieve the optimal effect, and obtain an analysis report of joint acceleration performed by the CDN acceleration service providers nationwide.

The protection scope of the present invention is not limited to module components, which are taken as an example in this embodiment, of the website acceleration system based on the content delivery network. Any variations such as flexible module component adjustment, module replacement, deletion and addition and the like made according to the actual needs are included in the protection scope of the present invention.

The purpose of the present invention is to realize the effects that the acceleration effects of the website in each national region are enabled to be optimal, the usage costs are reasonably controlled and the website may select a CDN acceleration service according to the practical situation of the website when the CDN acceleration service is used by the website.

Since different professional CDN acceleration service providers and website self-established CDN manufacturers are different in aspects of node distribution, bandwidth cost, server architecture matching, server performance, node performance and the like, how to enable the web site to select the CDN service suitable for the website to achieve the optimal acceleration effect is the technical problem to be solved by the present invention. In the present invention, the website can automatically and flexibly select services provided by various professional CDN acceleration service providers or website self-established CDN manufacturers according to the practical situations of the website itself, i.e., pertinently select to use or not use CDN acceleration services and use which CDN acceleration service, a working mode that CDN services provided by multiple professional CDN acceleration service providers and website self-established CDN manufacturers cooperate mutually is established, the acceleration effects of the website in each national region are enabled to be optimal, and the usage costs are reasonably controlled.

To sum up, the present invention effectively overcomes various disadvantages in the prior art and thus has a great industrial utilization value.

The above-mentioned embodiments are just used for exemplarily describing the principle and effects of the present invention instead of limiting the present invention. One skilled in the art may make modifications or changes to the above-mentioned embodiments without going against the spirit and the scope of the present invention. Therefore, all equivalent modifications or changes made by those who have common knowledge in the art without departing from the spirit and technical concept disclosed by the present invention shall be still covered by the claims of the present invention.

What is claimed is:

1. A website acceleration method based on a content delivery network, comprising:
    detecting a resource structure of a website and acquiring a domain name and resource of the website;
    monitoring operation data of the website, acquiring a user individual IP distribution of an accessed website, analyzing and acquiring a region to which the user individual IP belongs, a network operator type and resource accessed by the user individual IP;
    connecting an accelerated domain name provided by each CDN acceleration service provider, and establishing a comparison task of comparing each CDN acceleration service provider to the acceleration effect of the website according to the operation data of the website;
    acquiring an optimal accelerated domain name of the website in each region, each network operator and different types of resource according to a test result of the comparison task of the acceleration effect; and
    selecting an optimal CDN acceleration service provider corresponding to each resource according to the optimal accelerated domain name.

2. The website acceleration method based on the content delivery network according to claim 1, wherein the comparison task of the acceleration effects comprises performing comparison of the acceleration effect of different types of resource, specifically includes:
    comparison of acceleration effect of accessing resources under different domain names of the website;
    comparison of speed of accessing different resources under a same domain name of the website; and/or
    comparison of speed of accessing a same resource under a same domain name of the website.

3. The website acceleration method based on the content delivery network according to claim 2, wherein the comparison task of the acceleration effects further comprises performing comparison of acceleration effect of accessing different types of resource by different user individual IP, specifically includes:
    comparison of tested speed of accessing website resources by user individual IP of different network operator types in a same region under an acceleration service provided by each CDN acceleration service provider;
    comparison of tested speed of accessing website resources in different regions by user individual IP of a same network operator type in a same region under an acceleration service provided by each CDN acceleration service provider; and/or
    comparison of tested speed of accessing website resources in different regions by user individual IP of a same network operator type in different regions under an acceleration service provided by each CDN acceleration service provider.

4. The website acceleration method based on the content delivery network according to claim 3, further comprising:
    Establishing a comparison task of comparing each CDN acceleration service provider to the website acceleration effect and website non-acceleration effect according to conditions of different types of resource, different access conditions and different CDN acceleration service providers; and
    automatically analyzing according to the test result of the comparison task of the acceleration effect to confirm which CDN acceleration service provider achieves the optimal effect when being used in each region and by different network operators, and acquire an analysis report of joint acceleration performed by the CDN acceleration service provider nationwide.

5. The website acceleration method based on the content delivery network according to claim 1, wherein an implementation process of detecting the resource structure of the website and acquiring the resources under all domain names of the website comprises:
    detecting and extracting all uniform resource locators under the website; and analyzing all the uniform resource locators to obtain all resources of the website and domain names of the website to which each resource belongs.

6. The website acceleration method based on the content delivery network according to claim 1, wherein the CDN acceleration service provider comprises professional CDN acceleration service provider and website self-established CDN service mode.

7. A website acceleration system based on a content delivery network, wherein the website acceleration system based on the content delivery network comprises:
   a resource detection module, executed by a processor, and configured to detect a resource structure of a website and acquire a domain name and resource of the website;
   an operation monitoring module executed by the processor, connected with the resource detection module and configured to monitor operation data of the website, acquire a user individual IP distribution of an accessed website, analyzing and acquiring to acquire a region to which the user individual IP belongs, a network operator type and resource accessed by the user individual IP;
   an acceleration comparison module, executed by the processor, connected with the operation monitoring module and configured to connect an accelerated domain name provided by each CDN acceleration service provider, and establish a comparison task of comparing each CDN acceleration service provider to the acceleration effect of the website according to the operation data of the website;
   an acceleration selection module, executed by the processor, connected with the acceleration comparison module and configured to acquire an optimal accelerated domain name of the website in each region, each network operator and different types of resource according to a test result of the comparison task of the acceleration effect; and
   an acceleration execution module, executed by the processor, connected with the acceleration selection module and configured to select an optimal CDN acceleration service provider corresponding to each resource according to the optimal accelerated domain name.

8. The website acceleration system based on the content delivery network according to claim 7, wherein the acceleration comparison module comprises:
   a resource acceleration comparison unit, executed by the processor, and configured to perform comparison of the acceleration effect of different types of resource, including comparison of acceleration effect of accessing resources under different domain names of the website, comparison of speed of accessing different resources under a same domain name of the website, and/or comparison of speed of accessing a same resource under a same domain name of the website; and
   an IP acceleration comparison unit, executed by the processor, and configured to perform comparison of acceleration effect of accessing different types of resource by different user individual IPs, including comparison of tested speed of accessing website resources by user individual IP different network operator types in a same region, comparison of tested speed of accessing website resources in different regions by user individual IP of a same network operator type in a same region, and/or comparison of tested speed of accessing website resources in different regions by user individual IP of a same network operator type in different regions under an acceleration service provided by each CDN acceleration service provider.

9. The website acceleration system based on the content delivery network according to claim 7, further comprising:
   an acceleration and non-acceleration comparison module, executed by the processor, connected with the operation monitoring module and configured to establish a comparison task of comparing each CDN acceleration service provider to the website acceleration effect and website non-acceleration effect according to conditions of different types of resource, different access conditions and different CDN acceleration service providers; and
   an acceleration result acquisition module, executed by the processor, connected with the acceleration selection module and configured to automatically analyze according to the test result of the comparison task of the acceleration effects to confirm which CDN acceleration service provider achieves the optimal effect when being used in each region and by different network operators, and acquire an analysis report of joint acceleration performed by the CDN acceleration service providers nationwide.

10. The website acceleration system based on the content delivery network according to claim 7, wherein the resource detection module comprises:
   a resource information detection unit, executed by the processor, configured to detect and extract all uniform resource locators under the website; and
   a resource information acquisition unit, executed by the processor, connected with the resource information detection unit and configured to analyze the all uniform resource locators to obtain all resources of the website and domain names of the website to which each resource belongs.

* * * * *